United States Patent Office 2,710,955
Patented June 14, 1955

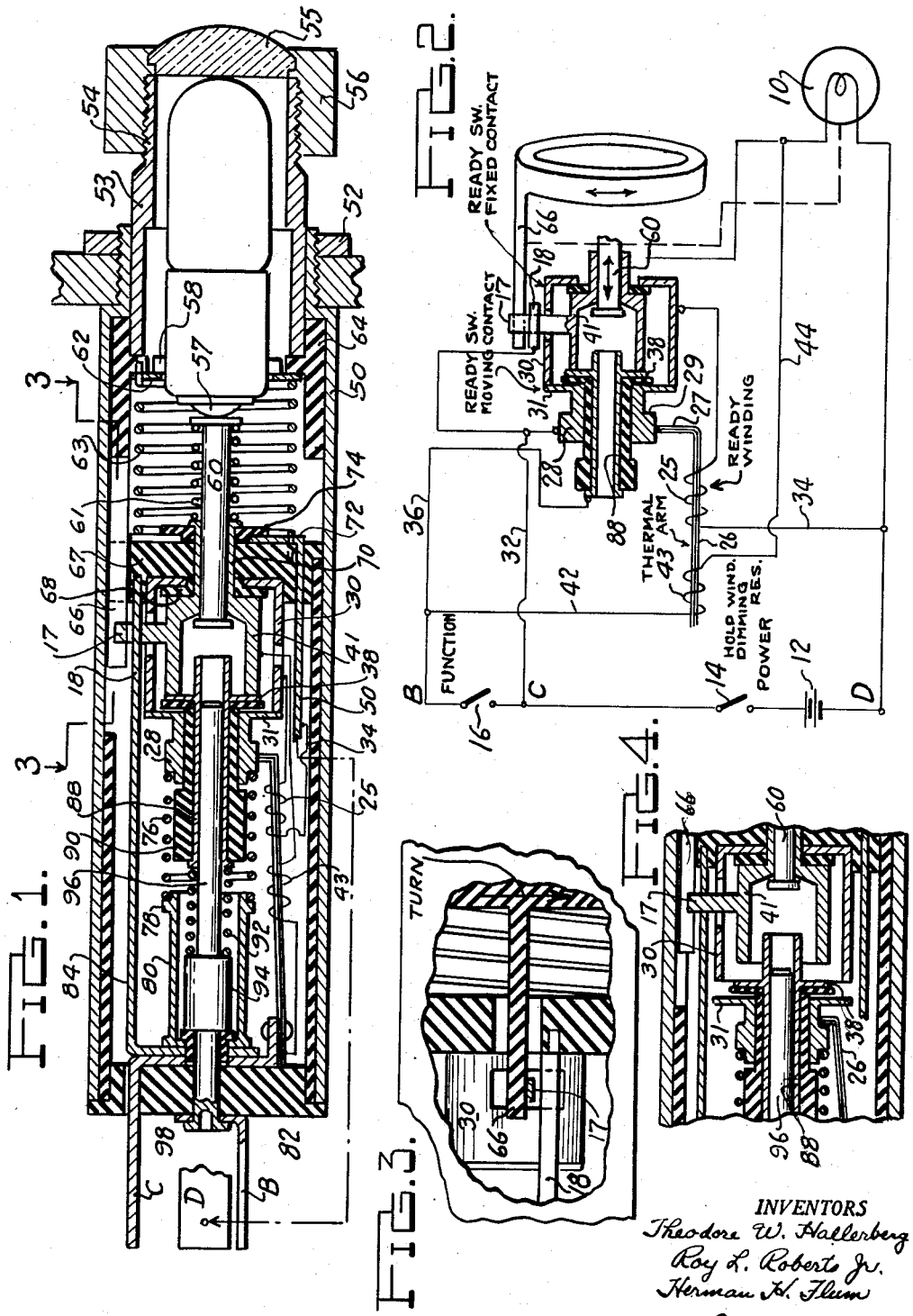

2,710,955

WARNING LIGHT WITH TURN-TO-TEST SWITCH

Theodore W. Hallerberg, Los Angeles, Roy L. Roberts, Jr., Fullerton, and Herman H. Flum, Southgate, Calif., said Roberts, Jr. and said Flum assignors to said Hallerberg Application March 3, 1954, Serial No. 413,824

4 Claims. (Cl. 340—252)

This invention relates to warning lights of the type used in aircraft to indicate either a misfunction of a particular apparatus or an omission of a necessary operation. Lights of this character must be of small size and of a high degree of dependability, and preferably must be capable of separate testing apart from the circuit or apparatus being monitored. Devices incorporating the present invention meet these essential requirements and in addition have many advantages over the units known and used at the present time. The primary object of the present invention, therefore, is to improve the reliability and utility of presently known warning or monitoring lights.

Another object of the invention is to provide an improved monitoring light that will not fail to give a signal in the event of failure of any of its internal wiring apart from the lamp itself.

Another object of the invention is to provide a simple but effective and reliable testing switch by which the condition of the monitoring lamp can be determined by a simple turning movement of an exposed portion of the device.

Warning lights of the type with which the present invention are concerned are used in aircraft that must be flown successively on either day or night flights and perhaps by different crews. It is well known that a warning light that is of sufficient brilliance to alert an observer at night may be too dim for daytime use, and that a light of the intensity required for daytime warning may be of blinding brilliance at night. For this reason lights are frequently made adjustable so that the operator can, during the test procedure prior to take-off, adjust the intensity with which his warning lights will burn if any warning is given during the flight. The preflight procedure may call for testing of all warning lights, but if this is omitted for any reason and the lights have been set for a low brilliance by a previous operator it is readily apparent that they may be too dim for a subsequent daytime use. The present invention, therefore, incorporates a device by which the first indication that is given of a failure is a bright light that can be seen either at night or in the daytime, and provision is made by which the light may be instantly dimmed by the operator if the signal is of an annoying brilliance. Thereafter the light will burn at the subdued brilliance as long as the failure or monitored condition persists, but will be automatically reset to its initial condition when the power is turned off or the failure corrected.

Briefly, the present invention comprises a combination of elements including a warning lamp, a power source for the lamp, and a "function" circuit which, when closed, will cause the lamp to burn. The warning light is disposed in a casing a portion of which is exposed so that the operator may move it, for example, in an inwardly axial direction, and within the casing is a latch which includes an electrically energized member that is active whenever a parallel circuit to the power source is closed, and a cooperating member moved with the movable housing part into engagement with the electrically energized latch member. Thus, when the housing part is moved by the operator the latch will be closed, and the arrangement is such that the lamp will burn at low intensity thereafter, because power to the lamp is supplied through another parallel circuit including the function switch and a resistance which may conveniently be associated with the electrically energized portion of the latch. If either the function switch and main power switch are thereafter reopened, as at the conclusion of a flight, the latch is released and the parts restored to the original position. In combination with these elements the present invention provides a separate testing switch that may be closed by the operator by turning the exposed portion of the housing.

Further advantages and a disclosure of the preferred embodiment of the invention are set forth in the following specification, reference being had to the accompanying drawings in which:

Fig. 1 is a somewhat diagrammatic longitudinal sectional view of a monitor light embodying the present invention;

Fig. 2 is a circuit diagram with certain parts indicated diagrammatically;

Fig. 3 is a section on line 3—3 of Fig. 1; and

Fig. 4 is a fragmentary sectional view of certain of the parts standing in the position occupied during a "dim" lamp phase.

Referring first to the circuit diagram of Fig. 2, the present invention includes means for controlling the operation of a warning or monitor lamp 10, the power source for which is shown as comprising a battery 12. A power switch 14 is in circuit with the battery, and a function switch 16 is connected to establish a parallel circuit as hereinafter described.

The function switch 16 is a normally open circuit controlling means that is capable of closing an electric circuit upon the occurrence of a predetermined condition. For example, the switch may be closed if engine temperature exceeds a predetermined maximum, or if a hydraulic pressure falls below a predetermined minimum. It is apparent that of the many devices and conditions required to be monitored in connection with the operation of an aircraft, nearly all of them can be arranged to close an electric circuit upon occurrence of an abnormality or an omission.

Prior to closing of the function switch no current flows to the lamp 10. However, a testing circuit is provided by which the lamp circuit may be temporarily closed by the operator merely to establish the fact that the lamp and its associated parts are in operating condition, ready to give an indication should the function switch close. In my co-pending application Serial No. 412,470 testing is done by the operator pushing inwardly on an exposed portion of the housing of the device, using the same motion that is used to dim the lamp from a bright indication in the event of closure of the function switch. As set forth in said application and as will be apparent from the following description, the parts become latched in the inwardly pressed position so that any indication given by closure of the function switch will be a dim indication if it occurs during the few seconds immediately following the testing operation normally consumed by cooling of the thermal arm portion of the latch.

In accordance with the present invention testing is accomplished by imparting a turning movement to an exposed portion of the housing for the unit to thereby close a testing switch comprising a movable contact 17 against a stationary contact 18. Preferably, the movable contact is made in the form of a small projection from a stationary current carrying element within the housing. When contacts 17 and 18 are closed, the circuit to the lamp as indicated in Fig. 2 is; from battery 12, power switch 14, junction C, to contact 18, contact 17 and through lead 20 to the lamp and thence back to the battery via junction D. As will be hereinafter described in conjunction with Fig. 1, lead 20 and the described junction points take a different physical form from that shown in Fig. 2 where the circuit is diagrammed for clarity.

As soon as the power switch 14 is closed, a parallel circuit around the lamp is established through a coil 25 designated as a "ready winding," wound over a thermally deformable bimetallic arm 26 fixed within the casing of the warning device. The resistance of coil 25 is such that the heat emanating therefrom causes the bimetallic arm 26 to assume a position such that a hook-like end 27 thereof can act as a detent in cooperation with another latch member 28 by engagement with a shoulder 29 over which the hook-like end 27 of the arm 26 will engage when the member 28 is moved inwardly by the operator. The circuit to the ready winding 25 includes a pair of relatively movable contacts that are normally closed to complete the circuit, but are movable to open position whenever the operator desires. In Fig. 2 the contacts in the circuit to the ready winding are shown as a stationary contact 30 and a movable contact 31 formed as a properly dimensioned lateral flange extending from the latch member 28 and connected electrically by a lead 32 to junction C and power switch 14. The ready winding 25 is electrically connected between the stationary contact 31 and junction D by means of lead 34. Thus, when the power switch 14 is first closed, current flows from battery 12 to junction C through lead 32, body 28, movable contact 31, fixed contact 30, the ready winding 25, lead 34, junction D and back to the battery. Since this circuit is in parallel with the lamp it does not affect its operation in any way. The circuit is opened, of course, whenever contacts 30 and 31 are opened and this occurs when the operator or pilot wishes to dim the display of the lamp 10.

The present invention provides an initially bright display of lamp 10 when the function switch 16 is closed. This circuit is as follows: from battery 12, through power switch 14, past junction C, through function switch 16, junction B, connection 36, a movable contact 38, fixed contact 41, a pushable contact stem 60, lead 20, to lamp 10 and back via junction D to battery 12. It will be noted that there are no resistive devices, adjustable or otherwise, in this circuit so that lamp 10 burns at full brilliance. An adjustable resistance may be placed in this circuit, however, to establish a predetermined brilliance for the initial burning of the lamp if desired.

A second internal switch is formed by contacts 38 and 41 within the housing and is opened by the same movement that opens the ready switch formed by contacts 30 and 31. This second switch 38—41 is in the "bright" circuit above described and is diagrammatically indicated in Fig. 2.

A parallel "dim" circuit to the lamp around the bright circuit above described includes a lead 42, a second resistance winding 43 wound over the bimetallic arm 26 and a lead 44 to the lamp from the said winding 43. The resistance of the winding 43 is such that the arm 26 will be heated and held in a latched position with its hook end 27 over the shoulder 29 of the member 28 by the heat from this winding alone should the circuit to the ready winding 25 be opened as above described. For this reason winding 43 is designated as a "hold" winding. The resistance of the winding being in series with the lamp 10, the lamp will glow with a subdued brilliance whenever the circuit thereto is closed only through the hold winding, and by reason of the function switch being closed at the same time.

Prior to describing the preferred form of the various elements so far described, which form is shown in Fig. 1, the operation will be described.

In its preferred use, the present invention is incorporated in the monitoring system of airplanes. In such systems regulations require that each monitor light be tested prior to take-off. The present invention so orients the elements that this testing is done by turning a small ring surrounding the lamp being tested, and is for the obvious purpose that the condition of the lamp should be known to the operator for take-off.

When the main power switch 14 is closed, the operator can test the device by turning the aforementioned exposed ring to complete a circuit between test contacts 17 and 18 through the displacement of certain parts hereinafter described and thus establish a circuit through lamp 10 and the battery 12. If the lamp is in operating condition it will glow at full brilliance.

Closure of the main power switch 14 causes the ready winding 25 to begin to heat and the bimetallic arm 26 to become deformed to move against the body 28. The hook end 27 of the bimetallic arm thus stands ready to snap in over shoulder 29 in the event that the operator pushes the unit in to dim the display of the lamp 10.

It has been assumed so far that the function switch 16 is open. If during the flight a monitored function occurs the function switch 16 will close and will complete two parallel circuits. The first is the bright circuit through lead 36, movable contact 38, fixed contact 41, reciprocable contact 60, lead 20 and through the lamp 10 back to the battery which will cause the lamp 10 to glow at full brilliance. The second parallel circuit is the dim circuit through lead 36, lead 42, hold winding 43, lead 44 to lamp 10. The hold winding, therefore, adds its heat energy to the bimetallic arm 26. If the operator thereafter depresses the rim of the unit to dim the display the hook end 27 of the arm 26 will move in over the shoulder 29 and retain the body 28 in its depressed position. The circuit through the ready winding is thus broken at the switch 30—31. The bimetallic arm 26 will, however, remain deformed by reason of the heat supplied from the hold winding 43 alone. Movement of the sliding body member or reciprocable contact 60 not only breaks the contact between switch parts 30—31 but also the contacts between 38 and 41 as indicated in Fig. 4. Thus the only circuit through the lamp is through the hold winding and the resistance of this winding causes the lamp to glow at a subdued brilliance.

After the function switch 16 is opened as by correction of the misfunction that has been monitored, the hold winding becomes cool by reason of the fact that no current thereafter flows through it and the arm 26 assumes its undeformed position. This permits the body 28 to snap back to the position shown in Figs. 1 and 2 so that switch points 30 and 31 and 38 and 41 are again closed and the ready winding is again heated.

After completion of the flight the power switch 14 is opened and no current will flow either through the ready winding 25 or the hold winding 43. The device is thus positioned so that contacts 30 and 31 and 38 and 41 are closed and any dim setting that might have been held over from the previous flight is cancelled because the bimetallic arm 26 will inevitably move away from shoulder 29 and permit the switch parts to spring back to their normal position.

Having described this schematic and diagrammatic disclosure of the invention, reference will now be made to Fig. 1 which shows a central longitudinal sectional view, somewhat enlarged, of an actual embodiment. As there shown the device is housed in a casing 50 which may be conveniently threaded at its outer end for attachment to a bulkhead between a shouldered portion of the casing 50 and a gland nut 52. Within the outer portion of the casing there is disposed a cylindrical body 53 which is mounted not only for free reciprocating movement but also for turning movement and this portion of the body has an extension 54 adapted to receive a lens 55 and a turning and operating ring 56 at its outer end. The ring 56 may conveniently be screwed on to the end of the cylindrical extension and form a convenient opening by which the lamp 10 may be replaced.

The lamp contacts are the usual center contact 57 and shell contacts 58 and connections to each are made by springs pressed connectors. In the case of the center lamp contact 57 the connector is in the form of a rod-like member 60 pressed outwardly by spring 61 and in the case of the shell contact 58 the connector is in the form of a ring 62 biased upwardly by a spring 63 but limited in its outward movement by a shoulder 64 on a reciprocable insulating sleeve 65 so that the spring 63 serves to bias outwardly the entire reciprocable portion of the lamp holder. In the form shown the lamp is pressed inwardly by engagement of its outer end with the lens and the operating ring 56 is tightened until the lamp contacts 57 and 58 are made against their respective connectors. The insulating sleeve 65 has a finger extension 66 formed intergal therewith and lying along one side of the interior of the housing 50. The finger 66 is made of sufficient length that it will engage a movable or deformable test contact 18 in a manner hereinafter described.

A central insulating partition 67 extends across the interior of the housing 50 and serves as a stationary base for the springs above mentioned and for the support of stationary contact members in the circuit of the ready winding 25 and in the bright circuit. Spring 63 which makes contact with the shell of the lamp is anchored in the partition 72 and in the housing shoulder 64 so that a turning movement of the upper insulating sleeve 65 from which shoulder 64 projects is resisted by the torsion of spring 63. At the lower or outer side of the partition 67 there are mounted concentric contact members 30 and 41 insulated from each other by a small insulating disk 68. The inner contact member 41 is provided with a hollow stem 70 that extends through an opening in the disk 68, through the partition 67, through an opening in an inturned contact member 72 and through an insulating grommet 74 where it is upset to clamp the parts in position with respect to each other and to the partition 67. The stem is made hollow to receive the rod-like connector and operating member 60 and to guide it in its reciprocating movements imparted thereto when the operator presses the operating ring 56 at the exposed end of the housing. It will be seen, therefore, that when the operating ring 56 is moved inwardly the rod-like connector member 60 will likewise move inwardly and will be guided by the stem of the connector member in the partition 67.

The outer concentric contact 30 is also held in place by the clamping action of the contact 41 against the insulating partition 67. This contact is electrically connected to the base of the lamp 10 and is preferably provided with a struck up, radially extending contact 17. The contact 17 is thus made of relatively thin and resilient metal and may be moved against a cooperating test contact hereinafter described.

The outer contact 30 cooperates with a movable contact 31 which may be conveniently formed as a flange on the metallic conductor body 28 and which is biased upwardly against contact 30 by a spring 76 the outer end of which bears against a shoulder 78 of a tubular metallic element 80 which in turn is clamped against a laterally extending portion 82 of terminal C. An upwardly extending finger at the potential of terminal C is designated 84 and has one end in contact with the tubular metallic element 80 and the opposite end fixed in a suitable recess in the insulating partition 67 so that the finger is held against rotational displacement in the housing and serves as the stationary contact 18 of the test switch against which the test contact 17 may be bent. It will thus be seen that the finger extension 84, tubular metallic element 80, spring 76, body 28, and the flange-like extension 31 thereof are all at the potential of terminal C so that closure of the circuit between contacts 17 and 18 bring the base of the lamp 10 to the potential of terminal C and cause the lamp to be lighted regardless of the position of the other parts of the device. It will be noted that the outer concentric contact 30 is connected electrically to the ready winding 25 and that a suitable connection is made from the opposite end of the ready winding by lead 34 to terminal 50 which is at the potential of junction D in the circuit diagram, Fig. 2.

The inner concentric contact 41 cooperates with a movable contact 38 which is preferably formed as a shoulder or flange extending from a tubular metallic body 88 disposed within the metallic body 28 but insulated therefrom by a tubular insulating member 90. This assembly is biased upwardly by a spring 92 disposed between the insulation and an enlargement 94 on a stem 96 over which the assembly is guided for reciprocating movements. The stem 96 extends beyond the base of the unit and is upset at 98 over terminal B to hold the parts in place and also to carry current from the terminal into the unit to the movable flange contact 38.

The bimetallic arm 26 is fixed to the lateral extension 82 of terminal C within the housing.

In operation, as soon as the power switch 14 is closed the operator can test the condition of the warning lamp 10 by turning the ring 56 which is fixed to the exposed portion of the housing. This turning movement causes the insulating finger or extension 54 to bend or displace the contact 17 against the stationary contact 18 and complete the testing circuit through the lamp. The turning movement "winds up" the spring 63 which thus restores the parts to the position in which contacts 17 and 18 are open as soon as the operator releases his turning pressure.

If, during the operational period, the function switch 16 should close, the bright circuit is established and lamp 10 burns at its full or pre-established brilliance. If the operator wishes to dim this light he can do so by pushing in on the exposed portion of the housing. This moves the rod contact member 60 inwardly and the inward motion (after a short lost motion period) is imparted to the tubular metallic element 88, and the entire lower or inner assembly is moved ahead of the rod. Thus contact between switch parts 30—31 and 38—41 is broken, the ready circuit is broken, and the circuit to the lamp 10 through the hold winding is activated. The resistance to the hold winding is thus placed in series with the lamp 10 which thereafter burns at a subdued brilliance. As the body 28 is depressed the hook-like end 27 of the bimetallic arm 26 springs in over the shoulder 29 and prevents the lower switch parts from being urged back to their original position by their respective springs 76 and 92 even though the operator releases his pressure on the exposed portion of the housing. Thus a simple striking movement by the operator latches the parts in the position which causes the lamp 10 to be dimmed.

In the event of clearance of the trouble that caused the function switch 16 to close so that this switch is again opened, no current will flow through the hold winding 43 and the bimetallic arm 26 will become cooled. As the arm is cooled the hook 27 moves away from shoulder 29 and springs 76 and 92 then force the parts to their original position so that switch parts 30—31 and 38—41 are closed. The ready winding then again begins to heat up, and the parts are disposed for an additional warning signal from the function switch 16.

It will be noted that the disposition of the wiring within the housing is such that should any failure take place the most that can happen is that the lamp 10 cannot successfully be dimmed by the operator. Any warning would thereafter cause the lamp to glow at full brilliance.

While the invention has been disclosed in conjunction with a specific form and disposition of the parts it should be appreciated that numerous modifications and changes may be made thereto without departing from the spirit of the appended claims.

What we claim is:

1. In a warning light of the class described, a power source, a lamp, a housing for the lamp having a stationary part and an exposed relatively movable part, a switch within said housing closed by a turning movement of said exposed housing part to complete a circuit from said power source through said lamp, a function switch operable when closed to complete two parallel circuits from said power source through said lamp, one of which last-named circuits has a greater resistance than the other, second means operable by movement of said exposed housing part to break the circuit of lower resistance through said lamp, and latch means within said housing to maintain the open condition of said circuit, said latch means being energized by current flowing through said parallel circuit of higher resistance.

2. In a warning light of the class described, a power source, a lamp, a housing for the lamp having a stationary part and an exposed relatively movable part, a switch within said housing closed by a turning movement of said exposed housing part to complete a circuit from said power source through said lamp, a function switch operable when closed to complete two parallel circuits from said power source through said lamp, one of which last-named circuits has a greater resistance than the other, means operable by a reciprocatory movement of said exposed housing part to break the circuit of lower resistance through said lamp, and latch means within said housing to maintain the open condition of said circuit, said latch means being energized by current flowing through said parallel circuit of higher resistance.

3. A device in accordance with claim 1, and a spring to bias said exposed housing part outwardly, said spring being fastened at one end to said exposed housing part and at its other end to a stationary part, whereby to resist turning of said exposed housing part.

4. In a warning light of the class described, a power source, a lamp, a housing for the lamp comprising a stationary tubular part and a tubular body of insulating material telescoped within said tubular part and extending outwardly therefrom and movable relatively thereof in both turning and axial directions, a switch within said tubular part, a finger extension from said tubular body adjacent said switch whereby turning movement of said tubular body and finger imparts a closing movement to said switch to complete a circuit from said power source through said lamp, means biasing said tubular body in a direction such that said switch is normally open, a function switch operable when closed to complete two parallel circuits from said power source through said lamp, one of which last-named circuits has a greater resistance than the other, means operable by a reciprocatory movement of said tubular body to break the circuit of lower resistance through said lamp, and latch means within said housing to maintain the open condition of said circuit, said latch means being energized by current flowing through said parallel circuit of higher resistance.

No references cited.